United States Patent
Richards et al.

(10) Patent No.: US 10,235,914 B2
(45) Date of Patent: Mar. 19, 2019

(54) CAMERA COLORIMETER SYSTEM FOR DISPLAY CHARACTERIZATION

(71) Applicant: Facebook Technologies, LLC, Menlo Park, CA (US)

(72) Inventors: Evan M. Richards, Santa Clara, CA (US); Ye Yin, Pleasanton, CA (US); Shizhe Shen, San Mateo, CA (US); Simon Hallam, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 48 days.

(21) Appl. No.: 15/420,067

(22) Filed: Jan. 30, 2017

(65) Prior Publication Data

US 2018/0218656 A1     Aug. 2, 2018

(51) Int. Cl.
*G09G 3/00* (2006.01)
*G06T 7/90* (2017.01)
*G06T 5/10* (2006.01)
*G09G 3/20* (2006.01)
*G09G 3/32* (2016.01)

(52) U.S. Cl.
CPC ............... *G09G 3/006* (2013.01); *G06T 5/10* (2013.01); *G06T 7/90* (2017.01); *G09G 3/2003* (2013.01); *G09G 3/32* (2013.01); *G09G 2300/0452* (2013.01); *G09G 2320/0242* (2013.01); *G09G 2320/0666* (2013.01); *G09G 2320/0693* (2013.01); *G09G 2340/06* (2013.01); *G09G 2360/145* (2013.01)

(58) Field of Classification Search
CPC .................................................... G09G 3/006
USPC .......................................................... 345/589
See application file for complete search history.

(56) References Cited

U.S. PATENT DOCUMENTS

| | | | | |
|---|---|---|---|---|
| 8,172,402 B2* | 5/2012 | Vigouroux | ............. | H04N 5/913 345/204 |
| 8,405,674 B2* | 3/2013 | Sakai | ............. | G01J 1/4204 345/589 |
| 2003/0218725 A1* | 11/2003 | Cotton | ............. | G02B 13/08 353/69 |
| 2010/0195186 A1* | 8/2010 | Huang | ............. | G02B 5/201 359/295 |
| 2011/0025703 A1* | 2/2011 | Edge | ............. | G09G 5/02 345/591 |

* cited by examiner

*Primary Examiner* — Hai Tao Sun
(74) *Attorney, Agent, or Firm* — Fenwick & West LLP

(57) ABSTRACT

A camera colorimeter system simultaneously lights up one or more pixel units on a display panel, each pixel unit including colored subpixels, for characterization of the display panel. The system includes optical elements that directs the light emitted by the simultaneously lit one or more pixel units to a filter and a corresponding imaging device. Each filter is configured to block wavelengths of light other than predetermined range of wavelengths, thereby ensuring that each imaging device captures a filtered spectrum of light that originates from subpixels of the same color. Using the filtered spectrum, the system reconstructs the full spectrum of light, which can subsequently be used to regenerate the display characteristics of each pixel unit (and corresponding colored subpixels). Thus, the camera colorimeter system can characterize a display panel in significantly less time as compared to conventional systems and methods.

18 Claims, 7 Drawing Sheets

500

Simultaneously turn on a plurality of subpixels of a plurality of colors in a display panel
510

Capture, by a plurality of imaging devices, filtered spectrum of light of at least a part of the display panel passing through corresponding band-pass filters, to generate a plurality of captured filtered signals
520

Determine a spectrum of light at a predetermined location of the display panel
530

Reconstruct display characteristics of the plurality of subpixels of the display panel using the plurality of captured filtered signals and the determined spectrum of light at the predetermined location
540

FIG. 5

CAMERA COLORIMETER SYSTEM FOR DISPLAY CHARACTERIZATION

BACKGROUND

This disclosure generally relates to display panels, and more specifically, to characterizing pixels and/or the corresponding subpixels in a display panel using a camera colorimeter system.

Electronic displays such as organic light emitting diode (OLED) or quantum dot displays include pixel units, which may each include a variety of subpixels that emit different colored light (e.g., a red subpixel, a green subpixel, etc.). Electronic displays undergo characterization to ensure that each pixel unit (and corresponding colored subpixels) is appropriately calibrated and that the display characteristics (e.g., brightness, color accuracy) of the pixel unit can be accurately perceived.

Conventionally, colored subpixels are individually lit separately and captured by an imaging device (e.g., camera) in order to accurately characterize each colored subpixel. Individually lighting a colored subpixel ensures that the imaging device can isolate the contribution of a colored light that originates from the colored subpixel of interest without light interference from other colored subpixels. However, given that electronic displays today are increasingly complex with improving resolutions (e.g., more subpixels), conventional systems for characterizing colored subpixels require significant time investments in order to characterize a display by sequentially lighting up individual colored subpixels and characterizing each colored subpixel one at a time.

SUMMARY

Embodiments relate to determining characteristics of a display by capturing colored light emitted from simultaneously lit, differently colored subpixels of a pixel unit in an efficient manner using image capturing devices. Light emitted by simultaneously lit subpixels is passed through bandpass filters to isolate the contribution of light from each subpixel and subsequently, to reconstruct display characteristics corresponding to wavelengths extended beyond the predetermined ranges of wavelengths of the band-pass filters using a spectrum of light at a predetermined location determined using a color measurement instrument (e.g., colorimeter).

In one or more embodiments, a computing device of the system receives the filtered spectrum of light captured by each camera as well as the spectrum of light captured by the color measurement instrument and recalculates the full spectrum of light for each subpixel. For example, using the spectrum of light, the computing device determines how each filtered spectrum may have been affected when it was filtered and captured. As such, the computing device back-calculates the full spectrum of light for each lit subpixel which can then be used to reconstruct the display characteristics (e.g., XYZ tristimulus values) of each pixel unit of the display panel.

BRIEF DESCRIPTION OF THE DRAWINGS

FIG. 5 is a flowchart illustrating a process for determining characteristics of a display panel, in accordance with one embodiment.

DETAILED DESCRIPTION

Figure 1:
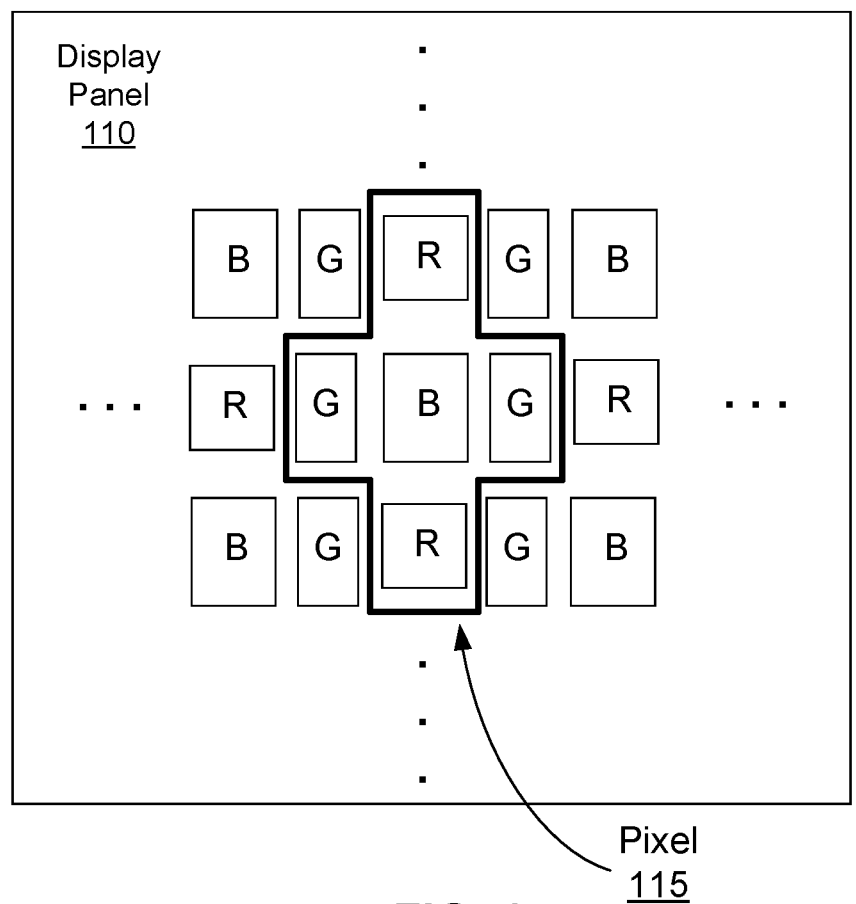
FIG. 1 is a diagram depicting an example of a pixel scheme on a display panel, in accordance with an embodiment.

The figures use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral (e.g. "imaging device 150" in the text refers to reference numerals "imaging device 1 (150A)" and/or "imaging device 2 (150B)" in the figures).

Embodiments relate to a multi-camera colorimeter system that enables the efficient characterization of a display panel by using bandpass filters to isolate interference of light from subpixels of different colors (e.g., red, blue, and green). The filtered light that is passed through a bandpass filter can be attributed to one or more similarly colored subpixels with limited or no contributions from differently colored subpixels. Using a spectrum of light captured by a colorimeter, a computing device regenerates the spectral curves for each spectrum of light that corresponds to wavelength ranges that were lost when the light was filtered. By doing so, the system can use the regenerated light spectra to determine characteristics (e.g., tristimulus values) of the display panel. This reduces the resources (e.g., time, computing resources) that are required to characterize a display panel as differently colored subpixels may be simultaneously lit up as opposed to having to separately light up the differently colored subpixels.

Example Display Panel

FIG. 1 is a diagram depicting an example of a pixel scheme on a display panel 110, in accordance with an embodiment. The display panel 110 includes red subpixels 102, green subpixels 104, and blue subpixels 106. Examples of display panels 110 include an organic light emitting diode (OLED), liquid crystal display (LCD), transparent OLED (TOLED), an active-matrix organic light-emitting diode display (AMOLED), and quantum dot display.

A pixel 115 unit cell may, for example include two red subpixels 102 and two green subpixels 104 that are situated around a center blue subpixel 106. Other examples of pixel schemes on a display panel 110 may include differently arranged red, green, and blue (RGB) subpixels. Additionally, pixel schemes on a display panel may replace or add subpixels to the RGBG subpixels depicted in FIG. 1. Examples of subpixel arrays include PENTILE® RGBG, PENTILE® RGBW, or any other suitable arrangement of subpixels that renders images at the subpixel level.

Each subpixel of the display panel 110 emits light of a certain color (e.g., red, green, and blue). The display panel 110 lights up one or more subpixels at any given time. For example, the display panel 110 may receive an input specifying that all subpixels in a pixel 115 unit cell are to be lit up simultaneously. In one or more embodiments, there may be spectral overlap between the differently colored light emitted from differently colored subpixels. In other scenarios, the display panel 110 receives an input that specifies that an individual subpixel (e.g., one red subpixel, one green subpixel) is to be lit up at a given time or alternatively, more than one pixel 115 unit cell is to be lit up at a given time. Therefore, at any particular time, the system 200 can characterize a portion of the display panel 110, the portion of the display panel 110 corresponding to the one or more pixel 115 units (or individual subpixels) that are lit up at that particular time.

Example System for Characterizing a Display Panel

Figure 2A:
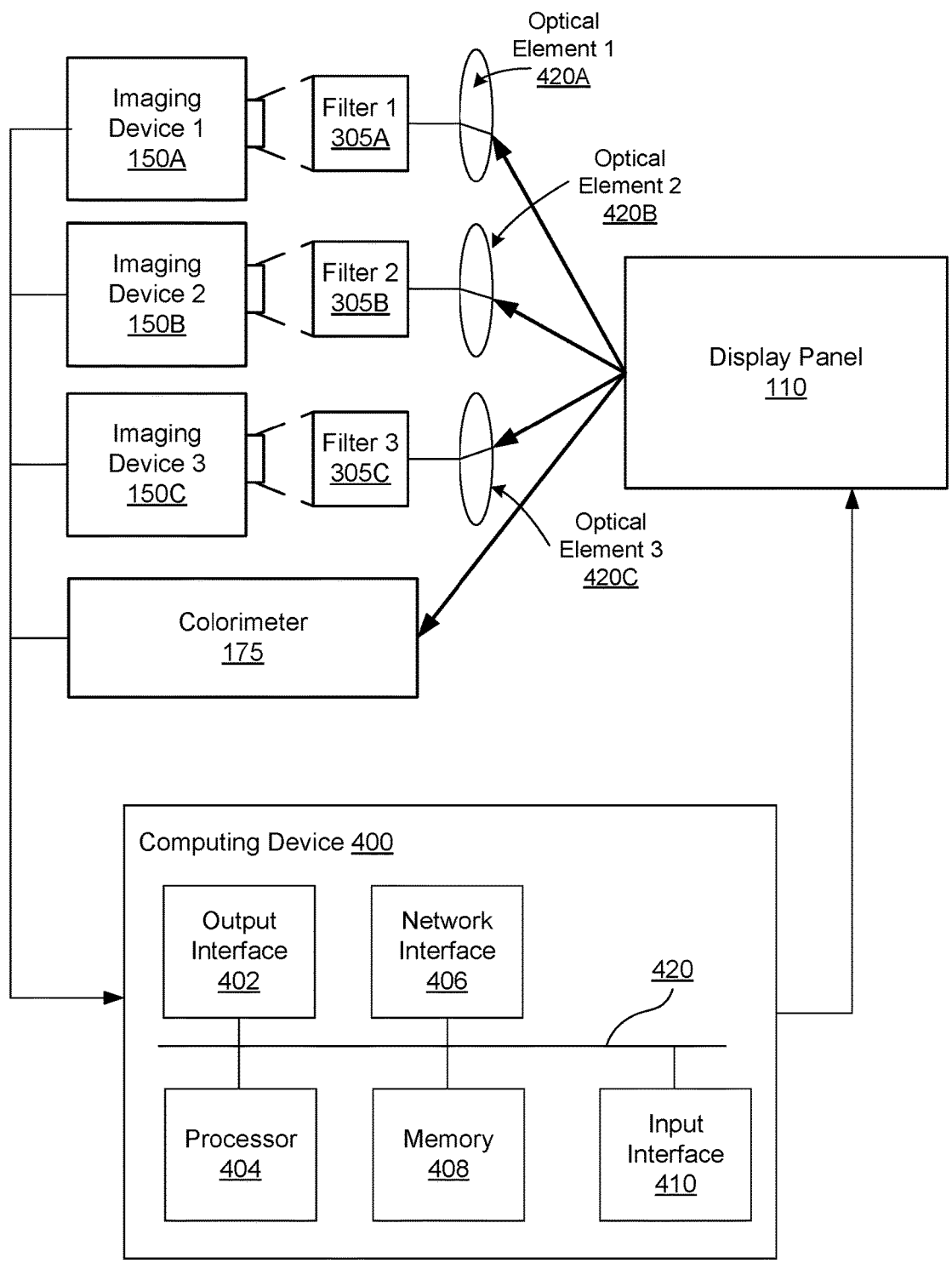
FIG. 2A is a block diagram of a system for determining characteristics of a display panel, in accordance with an embodiment.

FIG. 2A is a block diagram of a system 200 for determining characteristics of the display panel 110, in accordance with an embodiment. The system 200 may include, among other components, one or more optical elements 420, filters 305, imaging devices 150, a colorimeter 175, and a computing device 400. As depicted in FIG. 2A, the system 200 includes three optical elements 420 corresponding to three filters 305, and further corresponding to three imaging devices 150. In various embodiments, the total number of optical elements 420, filters 305, and imaging devices 150 in the system 200 may be chosen such that each colored light emitted by a particular subpixel on the display panel 110 can be received by at least one set of an optical element 420, filter 305, and imaging device 150 that is configured receive that particular colored light.

As previously described, the display panel 110 includes pixel 115 unit cells that are composed of individual subpixels. When turned on, each individual subpixel emits a light (e.g., red light, green light, blue light, etc.) that is received by at least one optical element 420.

Each optical element 420 is positioned to receive light emitted from individual subpixels of the display panel 110 and to direct the received light to a respective filter 305. More specifically, as depicted in FIG. 2A, each optical element 420A, 420B, and 420C is positioned between the display panel 110 and a corresponding filter 305A, 305B, and 305C, respectively. In other embodiments, the system 200 may include more than one optical element 420 positioned between the display panel 110 and a corresponding filter 305 to direct the emitted light from the display panel 110 to the corresponding filter 305. An optical element may be an aperture, a Fresnel lens, a convex lens, a concave lens, or any other suitable optical element that affects the image light emitted from the display panel 110. In some embodiments, each optical element 420 may have one or more coatings, such as anti-reflective coatings, that enable the optical element 420 to direct the light to the corresponding filter 305.

In various embodiments, each optical element 420 is further designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error.

Each filter 305 receives emitted light from the display panel 110 that is redirected through a corresponding optical element 420 and filters the light. The filter 305 is a bandpass filter designed to allow passage of a certain range of wavelength that corresponds to a particular color (e.g., red light, green light, blue light) while entirely, or at least partially, blocking light of other wavelengths. The filter 305 may attenuate or block light of different wavelengths based on the angle of incidence of the received light on the filter 305. The angle of incidence can vary based on the distance and orientation of the filter 305 relative to the display panel 110.

The filter 305 is located between a corresponding optical element and a corresponding imaging device 150. For example, Filter 1 (305A) through Filter 3 (305C) may each allow the passage of light of certain wavelength ranges, as described below in detail with reference to FIG. 4B. The ranges of wavelength may be set such that the light passed through each filter 305 include a light component from only subpixels of one color and does not include or include only negligible amounts of light components from other colored subpixels. That is, each filter 305 is configured such that the light that is passed through to and captured by a corresponding imaging device 150 only falls within a particular range of wavelengths.

In various embodiments, the system 200 may position more than one filter 305 between a corresponding optical element 420 and a corresponding imaging device 150 to ensure filtering of light as desired. This enables the system 200 to accurately determine the characterization of the display panel 110 even when subpixels of multiple colors are turned on simultaneously.

Each imaging device 150 receives the light filtered through a corresponding filter 305. The imaging device 150 may be a charge-coupled device (CCD) camera. In various embodiments, each imaging device 150 may be coupled with a corresponding filter 305 such that the filtered light outputted by a filter 305 is readily received by the imaging device 150 with limited attenuation of the filtered light. As will be referred to hereafter, the filtered spectrum of light captured by an imaging device 150 is a variety of captured signals that corresponds to the wavelength range that is allowed to pass through the corresponding filter 305.

Each imaging device 150 possesses inherent characteristics that are important for capturing a spectrum of light. For example, each imaging device 150 may have a CCD with varying quantum efficiencies when detecting light of varying wavelengths. In various embodiments, an imaging device 150 may be configured to have high quantum efficiencies (e.g., above 90%) at particular wavelength ranges that correspond to a particular color.

A colorimeter 175 detects spectrum components of light from one or more pixel 115 units at a pre-determined location on the display panel 110. The colorimeter 175 may be embodied as, but not limited to, a spectrophotometer, a spectrometer, or a spectroradiometer. Contrary to the filtered spectrum of light that is captured by an imaging device 150, the colorimeter 175 determines a spectrum of light that measures the intensities of light photons across the full range of wavelengths that includes light emitted by all subpixels (e.g., red subpixel 102, green subpixel 104, blue subpixel 106) located on the display panel 110. The colorimeter 175 is positioned and captures light from subpixels at a pre-determined location of the display panel 110. In various embodiments, the pre-determined location is at the center of the display panel 110.

The computing device 400 of the system 200 communicates with other components of the system 200 including the imaging devices 150 and the colorimeter 175 for the purposes of determining characteristics of the display panel 110. For example, from each imaging device 150, the computing device 400 receives a spectrum of light that describes the intensity of photons in the range of wavelengths that was allowed to pass through the corresponding filter 305. From the colorimeter 175, the computing device 400 receives the spectrum of light determined at the pre-determined location of the display panel 110. Using these received spectrums of light, the computing device 400 reconstructs the display characteristics of one or more pixel 115 units (and/or individual subpixels) of interest that are lit up in order to characterize the display panel 110. The computing device 400 may include, for example, components such as an output interface 402, a processor 404, a network interface 406, a memory 408, an input interface 410, and a bus 420 connecting each of these components.

The processor 404 retrieves and executes commands stored in memory 408. The memory 408 store software components including, for example, operating systems and modules for analyzing the received spectrums of lights and accurately regenerating the spectrum of light corresponding to a pixel 115 unit on a display panel 110 such that characteristics of each pixel 115 can be determined.

The input interface 410 may be any touch-screen interface, mouse, track ball, or other type of pointing device, a keyboard, an auditory input device, or some combination thereof, and is used to input data into the computing device 400. In some embodiments, the computing device 400 may be configured to receive input (e.g., commands) from the input interface 410 from the user. As an example, the input interface 410 may receive an input into the computing device 400 specifying that certain pixel 115 units are to be lit up at a particular time such that the portion of the display panel 110 corresponding to the pixel 115 units can then be characterized.

The output interface 402 is a component for providing the result of computation in various forms (e.g., text, image, or audio signals). For example, the output interface 402 may be a display that depicts the results of the pixel 115 characterization. The network interface 406 enables the computing device 400 to communicate with other components of the system 200 including the imaging devices 150, colorimeter 175, the display panel 110, and/or other computing devices 400 through a network.

Figure 2B:
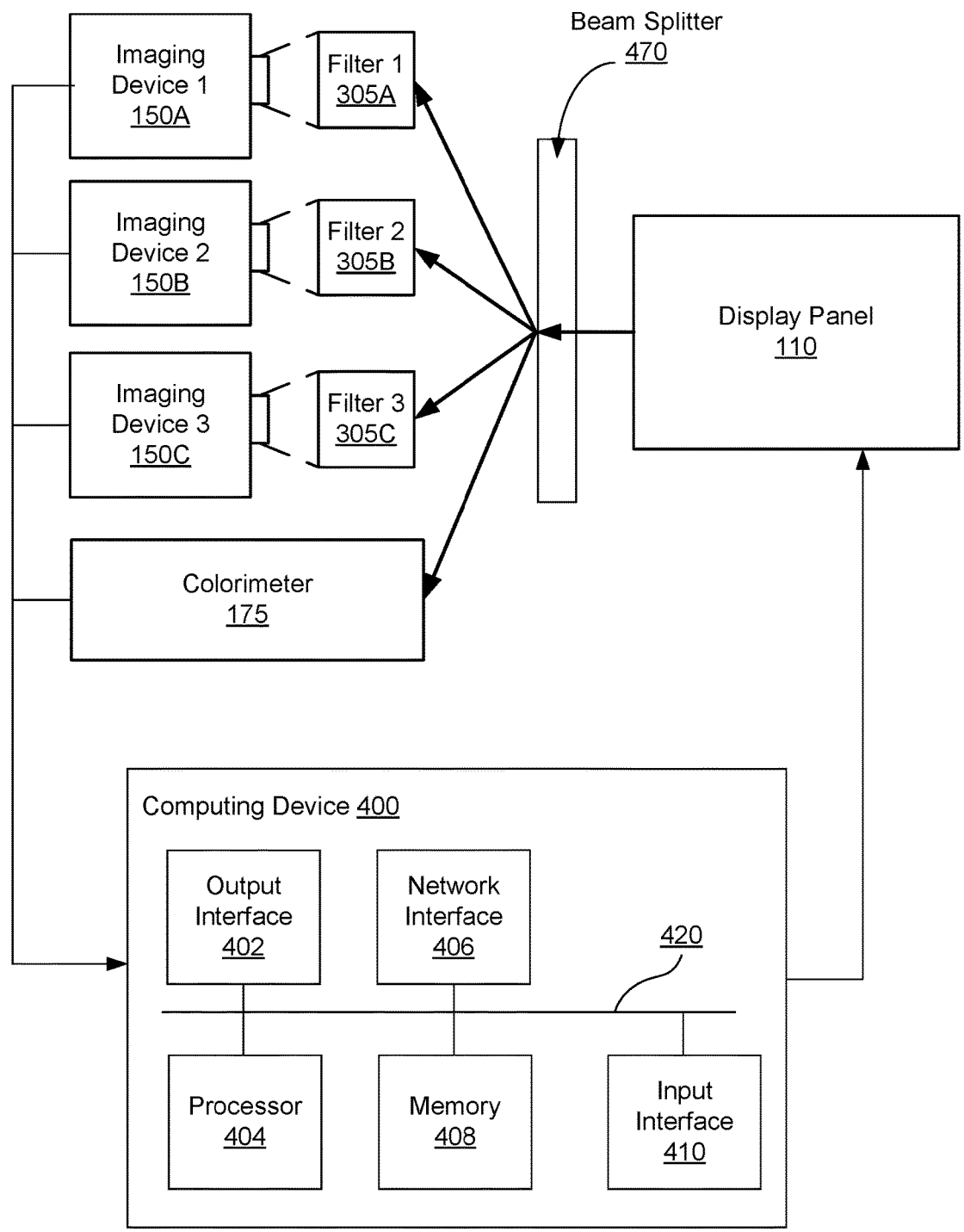
FIG. 2B is a block diagram illustrating a system for determining characteristics of a display panel, in accordance with another embodiment.

FIG. 2B is a block diagram illustrating a system for determining characteristics of a display panel using a beam splitter 470, in accordance with another embodiment. The embodiment of FIG. 2B differs from the embodiment of FIG. 2A in that a beam splitter 470 is utilized in place of separate optical elements 420.

Figure 3A:
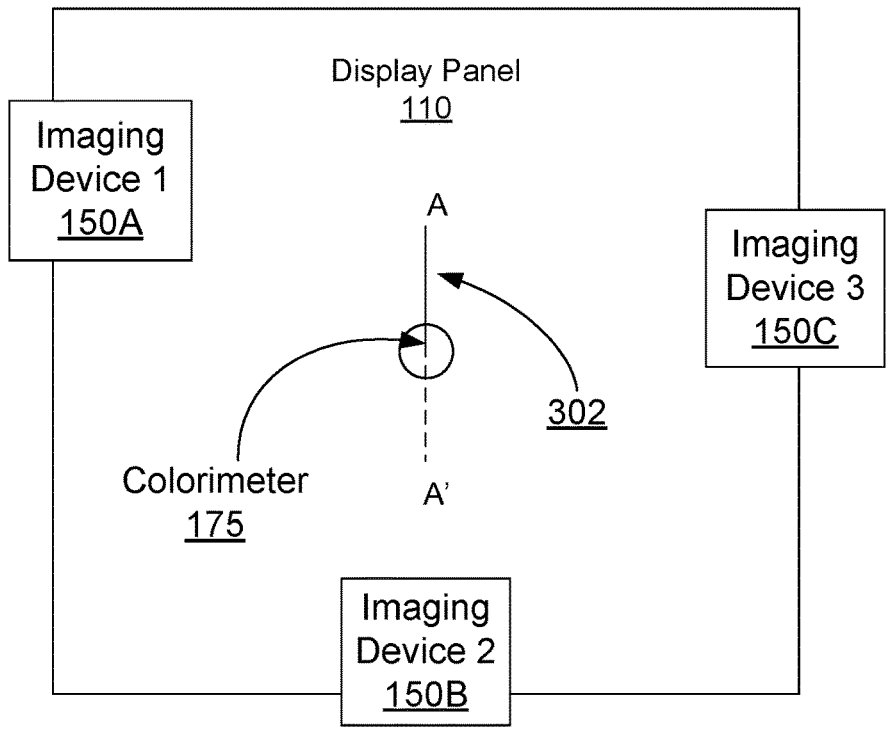
FIG. 3A is a schematic diagram illustrating an arrangement of imaging devices and a colorimeter relative to a display panel, in accordance with one embodiment.

FIG. 3A is a schematic diagram illustrating an arrangement of imaging devices 150 and spectrophotometer 175 relative to the display panel 110, in accordance with one embodiment. For example, each of the imaging devices 150 may be placed above the display panel 110 to capture the light emitted by the subpixels of the display panel 110. As specifically depicted in FIG. 3A, each imaging device 150 is located on the periphery of the display panel 110. Imaging device 2 (150B) is located long a center axis 302 of the display panel 110 (depicted by the A-A' section) whereas imaging device 1 (150A) and imaging device 3 (150C) are each offset from the center axis 302 of the display panel 110. Each imaging device 150 need not be specifically be placed on the periphery of the display panel 110; instead, each imaging device 150 can be placed at different locations above the display 110 relative to one another.

In various embodiments, the optical elements 420 that direct the light emitted from the display panel 110 to a corresponding filter 305 and imaging device 150 may be designed (e.g., different optical characteristics) to reduce measurement deviations that may arise due to different placement locations of the imaging devices 150. For example, each imaging device 150 may capture deviations that are dependent on the offset distance that each imaging device 150 is from the center axis 302 of the display panel 110. More specifically, as depicted in FIG. 3A, imaging device 1 (150A) and imaging device 3 (150C) may capture different measurement deviations as compared to imaging device 2 (150B) because each of imaging device 1 (150A) and imaging device 3 (150C) are positioned at a location that is offset from the center axis 302 of the display panel 110. As another example, deviations can arise from the sensitivity of imaging devices 150 to different environmental conditions (e.g., different temperatures, external lighting, wind, mechanical vibrations) that may be present at different locations around the display panel 110.

Figure 3B:
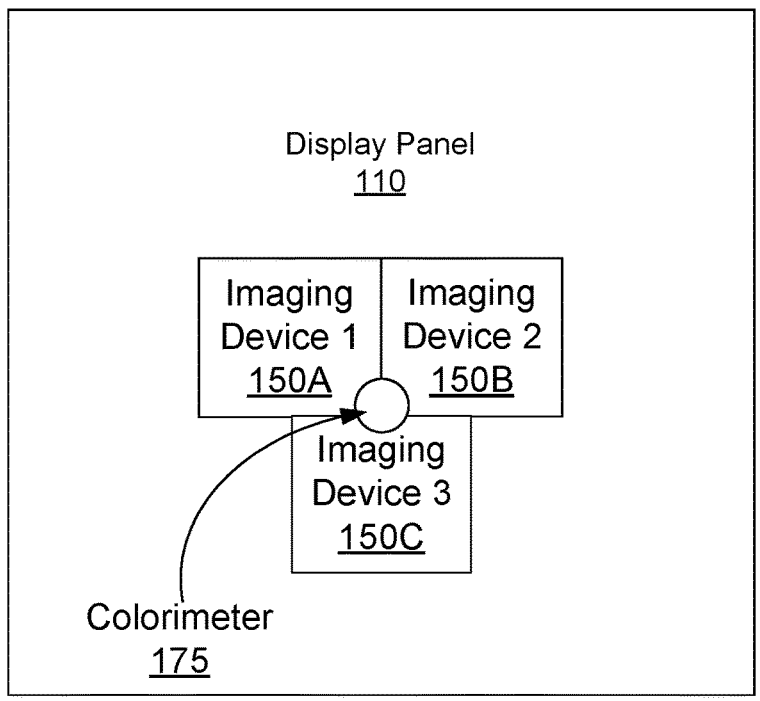
FIG. 3B is a schematic diagram illustrating an arrangement of imaging devices and a colorimeter relative to a display panel, in accordance with another embodiment.

Referring to FIG. 3B, employing the beam splitter 470 enables the various imaging devices 150 to be placed in relative proximity to one another. For example, the imaging devices 150 may each be centered above the display panel 110. In this embodiment, the beam splitter 470 of FIG. 2B directs the emitted light from the pixel 115 to each respective filter 305, which then directs the filtered light to a corresponding imaging device 150. As shown in FIG. 2B, the colorimeter 175 also receives light emitted from the display panel 110 through the beam splitter 470. However, in other embodiments, the colorimeter 175 may be positioned relative to the display panel 110 such that the light emitted by the pixels/subpixels on the display panel 110 can be received by the colorimeter 175 without first being split by the beam splitter 470.

In the previously described embodiment depicted in FIG. 2A, the optical elements 420 may reduce deviations that arise due to the variable placement locations of the imaging devices 150. In this embodiment (FIG. 2B), the imaging devices 150 (and the colorimeter 175) can be placed within proximity to one another above the display panel 110 due to the use of a beam splitter 470. Therefore, this embodiment can altogether avoid the deviations that would typically arise due to variable placement locations of the imaging devices 150 and/or the colorimeter 175.

Example Process for Characterizing Pixels of a Display Panel

Figure 4A:
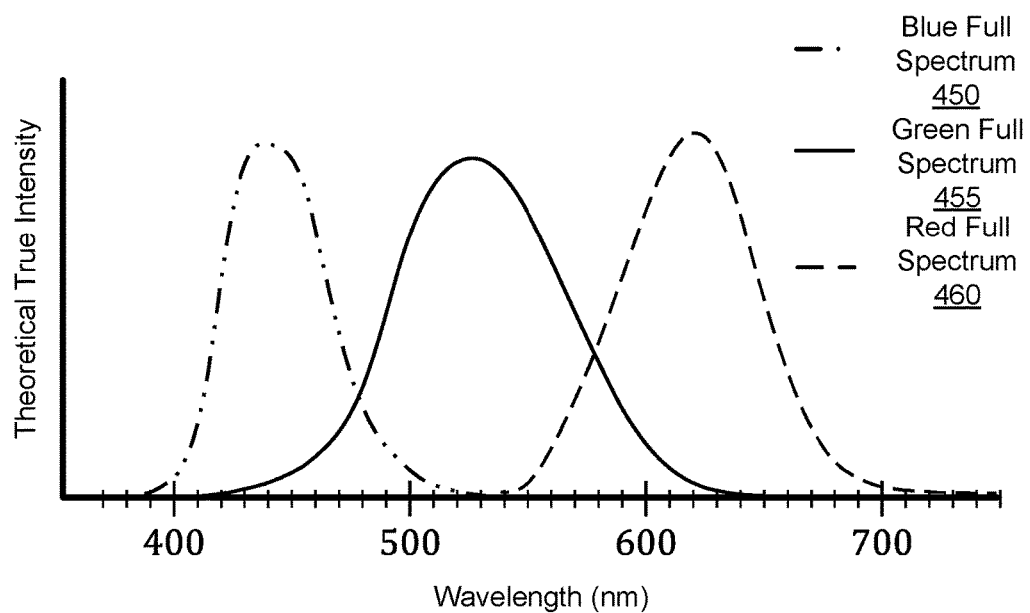
FIG. 4A is a graph illustrating full colored spectra emitted by pixels of a display panel, in accordance with one embodiment.
Figure 4B:
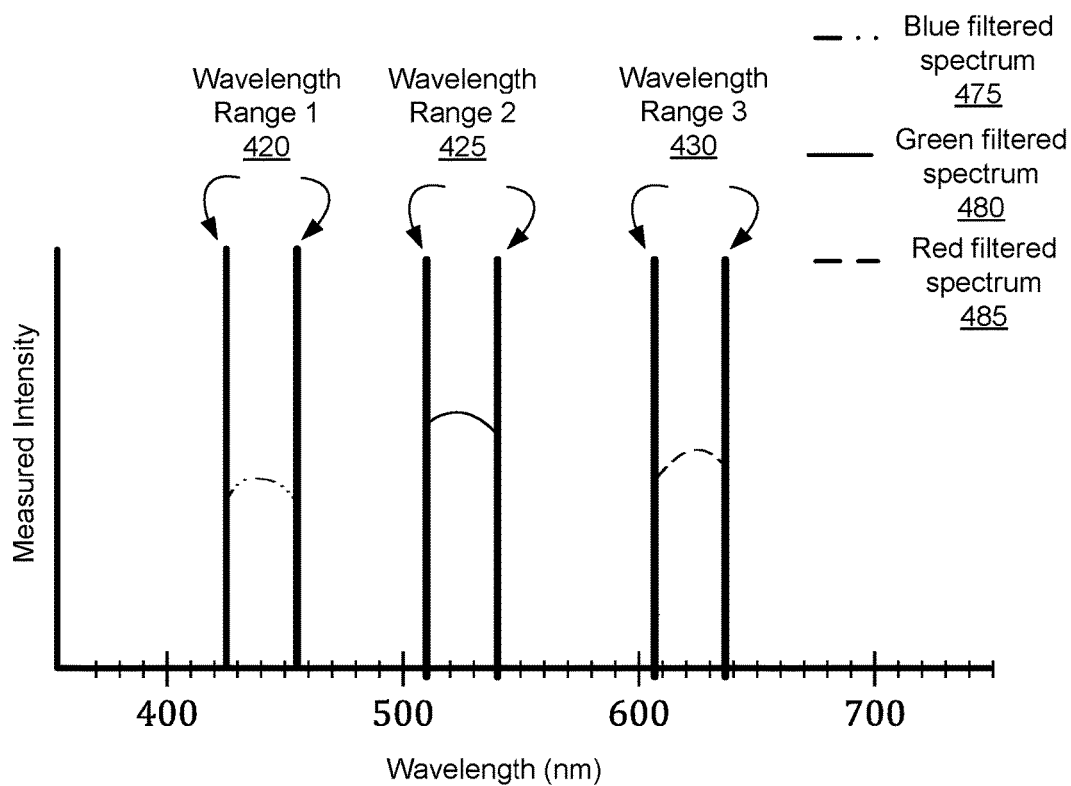
FIG. 4B is a graph illustrating the filtered colored spectra captured by imaging devices of the system of FIG. 2A, in accordance with one embodiment.
Figure 4C:
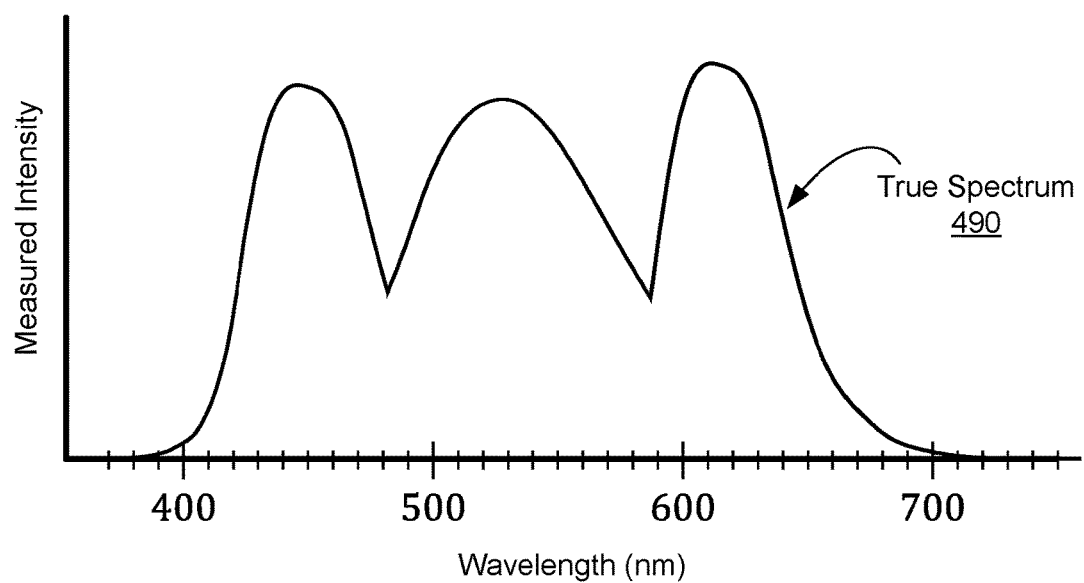
FIG. 4C is a graph illustrating a true spectrum of light captured by a colorimeter of the system of FIG. 2A, in accordance with one embodiment.

FIG. 4A is a graph illustrating full colored spectra emitted by a pixel 115 unit of the display panel 110, in accordance with one embodiment. FIG. 4B is a graph illustrating the filtered colored spectra 475, 480, and 485 captured by imaging devices 150 of the system of FIG. 2A, in accordance with one embodiment. FIG. 4C is a graph illustrating a true spectrum of light 490 captured by a colorimeter 175 of the system of FIG. 2A, in accordance with one embodiment. Further reference will be made to FIG. 5 which illustrates a process for determining characteristics of a display panel 110, in accordance with one embodiment.

To characterize one or more pixel 115 units of the display panel 110, the display panel 110 simultaneously turns on 510 the one or more pixel 115 units, each pixel 115 unit corresponding to multiple colored subpixels. In various embodiments, the display panel 110 can receive an input specifying the one or more pixel 115 units that are to be turned on simultaneously. The input may be originally sent by the computing device 400 of the system 200 that is used to characterize the display panel 110.

Each of the colored subpixels in the one or more pixel 115 units that are simultaneously lit emits a colored light corresponding to a particular range of wavelengths. For example, referring to FIG. 4A, the blue subpixels 106 that are lit on the display panel 110 contribute a blue full spectrum 450 corresponding to blue wavelengths of light. Additionally, the blue full spectrum 450 may have a true intensity value that corresponds to the number of photons emitted by blue subpixels 106. Therefore, if more blue subpixels 106 on the display panel 110 are simultaneously turned on, then the true intensity of the blue full spectrum 450 would correspondingly increase. Similarly, the green subpixels 104 and red subpixels 106 that are included in the simultaneously lit one or more pixel 115 units contribute a green full spectrum 455 and red full spectrum 460, respectively.

The emitted spectrum of light from the lit up pixel 115 units of the display panel 110 is directed by one or more optical elements 420 or a beam splitter 470 to respective filters 305. Each filter 305 is configured to block wavelengths of light outside a particular wavelength range. For example, referring now to FIG. 4B, each filter 305 receives the full spectrum of light from all subpixels and only passes light in a wavelength range that corresponds to a particular color. For example, filter 1 (305A) allows passage of only blue light that corresponds to wavelength range 1 (420). Similarly, Filter 2 (305B) passes only green light that corresponds to wavelength range 2 (425) and Filter 3 (305C) passes only red light that corresponds to wavelength range 3 (430). Although FIG. 4B depicts a particular range of wavelengths (e.g., approximately 30 nm range) at specific wavelength values (e.g., 425 nm to 455 nm for wavelength range 1 (420)), the range of wavelengths and specific wavelength values may differ in various embodiments. More specifically, each filter 305 is configured such that the maximum intensity (e.g., spectral peak) of the blue full spectrum 450, green full spectrum 455, and red full spectrum 460 are captured within each of the wavelength ranges 420, 425, and 430, respectively. The filtered spectrum of light is then passed by each filter 305 to a respective imaging device 150.

Each imaging device 150 captures 520 the filtered spectrum of light from its corresponding filter 305 and generates a filtered spectrum that is then provided to the computing device 400 of the system 200. For example, imaging device 1 (150A) generates an image of the display panel 110 representing narrow spectrum of light 475 generated by blue subpixels, imaging device 2 (150B) generates an image of the display panel 110 representing narrow spectrum of light 480 generated by green subpixels, and imaging device 3 (150C) generates an image of the display panel 110 representing narrow spectrum of light 485 generated by red subpixels.

As depicted in FIG. 4B, each filtered spectrum 475, 480, and 485 corresponds to the wavelength range 420, 425, and 430 passed by the respective filter 305. In various embodiments, each imaging device 150 captures a measured intensity (e.g., y-axis of FIG. 4B) for each filtered spectrum 475, 480, and 485. Given that the emitted light from the one or more lit up pixel 115 units on the display panel 110 is redirected by optical elements 420 (and/or beam splitter 470) and filtered through respective filters 305 before being captured by an imaging device 150, the measured intensity of each filtered spectrum 475, 480, and 485 captured by the imaging device 150 may be attenuated when compared to the true intensity (e.g., y-axis of FIG. 4A) of each full spectrum 450, 455, and 460. In various embodiments, signal attenuation may result from the quantum efficiency of each imaging device 150, which may vary at different wavelengths. Additionally, signal attenuation may vary based on the angle of incidence of light on each filter 305. Therefore, the system 200 considers the attenuation effects in characterizing the pixels 115 units of the display panel 110.

To do so, the system 200 employs the colorimeter 175 which determines 530 a spectrum of light from the center of the display panel 110. Here, the spectrum of light determined by the colorimeter 175 may be considered a true spectrum of light that measures the intensity of light across the full range of wavelengths (e.g., based on the specifications of a colorimeter which may include ranges of 400 nm to 700 nm or more). For example, a true spectrum of light 490 captured by the colorimeter 175 is depicted in FIG. 4C. Given that the colorimeter 175 captures all light emitted from the display panel 110, the determined true spectrum of light 490 does not distinguish contributions from the differently colored subpixels (as was depicted in each full spectrum 450, 455, and 460 in FIG. 4A). The colorimeter 175 provides the true spectrum of light 490 to the computing device 400 of the system 200.

The computing device 400 of the system 200 receives the filtered spectrum of light from each imaging device 150 and the true spectrum of light from the spectrophotometer 175 and reconstructs 540 display characteristics for the one or more lit pixel 115 units of the display panel 110. To reconstruct display characteristics, the computing device 400 may receive an input command to execute, by the processor 404, stored code in the memory 408 of the computing device 400. Alternatively, the processor 404 of the computing device 400 may automatically retrieve and execute the stored code in the memory 408 upon receiving the filtered spectrum of light from each imaging device 150 and the true spectrum of light from the spectrophotometer 175.

To characterize the lit up pixel 115 units, the computing device 400 regenerates the spectral curves corresponding to each full color spectrum (e.g., 450, 455, and 460 in FIG. 4A). More specifically, to regenerate a full spectrum, the computing device 400 analyzes characteristics of each filtered spectrum 475, 480, and 485 received from the imaging devices 150 as well as the characteristics of the true spectrum 490 from the colorimeter 175 and generates calibration values that represent the differences between the filtered spectra 475, 480, and 485 and the true spectrum 490. In various embodiments, the computing device 400 first regenerates each full color spectrum 450, 455, and 460 within their respective filtered wavelength ranges 420, 425, and 430 and subsequently regenerates the full color spectrum 450, 455, and 460 outside their respective filtered wavelength ranges 420, 425, and 430.

The computing device 400 can first account for the inherent qualities of the colorimeter 175 and imaging devices 150. Regarding the true spectrum 490, the computing device 400 can determine calibration values that account for the quantum efficiency of the colorimeter 175 at each wavelength. For example, the computing device 400 adjusts the measured intensity of the true spectrum 490 by the quantum efficiency of the colorimeter 175. Similarly, the computing device 400 can determine calibration values that account for the quantum efficiency of the imaging devices 150 by adjusting the measured intensities of the blue filtered spectrum 475, green filtered spectrum 480, and the red filtered spectrum 485 by the quantum efficiencies of their respective imaging device 150 that captured each filtered spectrum. More specifically, the computing device 400 divides the measured intensity of each spectrum 475, 480, 485, and 490 by the quantum efficiency of the respective device that captured the spectrum. Therefore, the computing device 400 can account for the differences in the measured intensities of the spectrum that arise from the inherent qualities of the imaging devices 150.

After the spectra are adjusted according to the quantum efficiency of their respective devices, the computing device 400 can compare the adjusted intensity values to determine the attenuation effects of the filters 305, optical elements 420, and/or beam splitter 470. In various embodiments, the computing device 400 conducts the comparison using the peak intensity values because the contributions of other colors are small or negligible at the wavelength corresponding to the peak intensity value of the color of interest. For example, referring to FIG. 4A, there are minimal contributions of green 455 and red full spectra 460 at around 440 nm where the peak intensity value of the blue full spectrum 450 occurs.

More specifically, the computing device 400 determines the adjusted peak intensity value of the blue filtered spectrum 475 and the corresponding wavelength at which that adjusted peak intensity value occurs (around 440 nm in FIG. 4B). The computing device 400 also determines the corresponding adjusted peak intensity value of the true spectrum 490 at or around the determined wavelength (around 440 nm). By comparing the two, the computing device 400 calculates calibration values that correspond to the attenuation effects of the filters 305, optical elements 420, and/or beam splitter 470. As an example, the computing device 400 may determine that the adjusted peak intensity value of the true spectrum 490 is some percentage (e.g., 20% or some other percentage value) higher than adjusted peak intensity value of the blue filtered spectrum 475. Therefore, this percentage of attenuation may be attributed to the application of a filter 305, optical elements 420, and/or beam splitter 470. Although the previous discussion describes only the blue filtered spectrum 475, the computing device 400 can apply the same logic for the green filtered spectrum 480 and red filtered spectrum 485.

In various embodiments, the computing device 400 may scale the adjusted intensity values of each filtered spectrum by the calibration value (e.g., percentage of attenuation). For example, the computing device 400 can increase each of the measured intensities of the blue filtered spectrum 475 between 425 nm and 455 nm by the percentage of attenuation to account for the effects of the filters 305, optical elements 420, and/or beam splitter 475. The green filtered spectrum 480 and red filtered spectrum 485 may be similarly adjusted by a different determined percentage of attenuation that is determined for their respective wavelength ranges. Therefore, the computing device 400 regenerates the blue full spectrum 450 between wavelength range 1 (420), green full spectrum 455 between wavelength range 2 (425), and the red full spectrum 460 between wavelength range 3 (430).

Having regenerated each full color spectrum 450, 455, and 460 within their respective filtered wavelength ranges 420, 425, and 430, the computing device 400 can proceed to regenerate each colored spectrum outside their respective wavelength ranges 420, 425, and 430. In some embodiments, the computing device 400 can curve fit the regenerated portion (which includes the peak maximum or spectral peak) of each color spectrum in order to further regenerate the wavelengths of the color spectrum that are outside the filtered wavelength ranges 420, 425, and 430. The curve fit may be predetermined and uniquely selected for each full color spectrum 450, 455, and 460.

After the computing device 400 regenerates the blue full spectrum 450, green full spectrum 455, and red full spectrum 460, the computing device 400 can then determine the characteristics of the red, green, and blue subpixels 102, 104, and 106 by simultaneously turning them on. For example, the computing device 400 uses the regenerated spectra to calculate the International Commission on Illumination (CIE) XYZ tristimulus values, as well known in the art.

In various embodiments, after characterizing one or more turned on pixel 115 units of the display panel 110, the system may characterize other portions of the display panel 110 that correspond to turned on additional pixel 115 units. In doing so, the computing device 400 may similarly receive the filtered spectrum of light from each imaging device 150 that corresponds to the additional pixel 115 units. In various embodiments, the computing device 400 can regenerate the spectral curves by using calculations that were determined when regenerating the spectral curve of the previous one or more turned on pixel 115 units. For example, if the first imaging device 1 (150A) captures blue filtered spectrum 475 through a narrow band pass filter 1 (305A), then for the first turned on pixel 115 unit, the computing device 400 can determine attenuation effects due to the first optical element 420A, the first filter 305A, and the first imaging device 150A (e.g., quantum efficiency). When characterizing additional turned on pixel 115 units, in particular blue subpixels of the additional pixel 115 units, the computing device can scale the magnitude of the blue filtered spectrum 475 based on the previously determined attenuation effects without having to redo the calculation. The computing device 400 can similarly apply this process for characterizing red and green colored subpixels.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

What is claimed is:

1. A system for characterizing a display panel, the system comprising:
  a plurality of band-pass filters, each band-pass filter configured to pass light within a different range of wavelengths;
  a plurality of imaging devices, each of the plurality of imaging devices configured to capture an image covering a plurality of pixels in the display panel through a different one of the plurality of band-pass filters to generate a plurality of captured filtered signals, wherein the image is generated at the display panel by turning on a plurality of subpixels of a plurality of colors;
  a color measurement instrument positioned to determine a spectrum of light from one or more of the plurality of pixels of the display panel; and
  a computing device configured to receive the plurality of captured filtered signals from the plurality of imaging devices and the determined spectrum of light, the computing device configured to:

regenerate a plurality of spectral curves corresponding to the plurality of pixels by extending the plurality of captured filter signals beyond predetermined ranges of wavelengths of corresponding band-pass filters based on the determined spectrum of light, wherein a portion of a first regenerated spectral curve of the regenerated plurality of spectral curves overlaps with a portion of a second regenerated spectral curve of the regenerated plurality of spectral curves; and reconstruct display characteristics of the plurality of pixels in the display panel using the regenerated plurality of spectral curves.

2. The system of claim 1, wherein the plurality of subpixels of the plurality of colors are turned on simultaneously for capturing by the plurality of imaging devices.

3. The system of claim 1, wherein the plurality of spectral curves are regenerated by:

generating calibration values by determining a difference between the spectrum of light determined by the color measurement instrument from the one or more of the plurality of pixels and a spectrum of light as represented by signal values of the plurality of captured filtered signals associated with the one or more of the plurality of pixels; and modifying the plurality of captured filter signals using the calibration values.

4. The system of claim 3, wherein the display characteristics of the plurality of pixels of the display panel are reconstructed by calculating color correction matrices for the plurality of pixels using the regenerated plurality of spectral curves.

5. The system of claim 1, wherein the reconstructed display characteristics comprise XYZ tristimulus values of each pixel in the display panel.

6. The system of claim 1, wherein the plurality of band-pass filters comprise a first band-pass filter configured to block light of wavelengths other than red light for generating a first captured filtered signal of the plurality of captured filtered signals, a second band-pass filter configured to block light of wavelengths other than green light for generating a second filtered signal of the plurality of captured filtered signals, and a third band-pass filter configured to block light of wavelengths other than blue light for generating a third filtered signal of the plurality of captured filtered signals.

7. The system of claim 6, wherein the first captured filtered signal includes a spectral peak corresponding to the red light, the second captured filtered signal includes a spectral peak corresponding to the green light, and the third captured filtered signal that includes a spectral peak corresponding to the blue light.

8. The system of claim 1, wherein the color measurement instrument is one of a colorimeter, spectrophotometer, spectrometer, or spectroradiometer.

9. The system of claim 1, further comprising a plurality of optical elements, each optical element configured to eliminate distortions in an image captured by a corresponding imaging device due to an offset of the corresponding imaging device from a center axis of the display panel.

10. The system of claim 1, further comprising a beam splitter between the display panel and the plurality of imaging devices to split light from the display panel into spectrums of light, wherein each spectrum of light is directed to each of the band-pass filters and the corresponding imaging device.

11. A method of determining color characteristics of a display panel, comprising:

turning on a plurality of subpixels of a plurality of colors in a display panel;

capturing, by a plurality of imaging devices, filtered images passing through different band-pass filters, to generate a plurality of captured filtered signals, each of the filtered images covering a plurality of pixels in the display panel, each of the different band-pass filters configured to pass light within a different range of wavelengths;

determining a spectrum of light from one or more of the plurality of pixels of the display panel;

regenerating a plurality of spectral curves corresponding to the plurality of pixels by extending the plurality of captured filter signals beyond predetermined ranges of wavelengths of corresponding band-pass filters based on the determined spectrum of light, wherein a portion of a first regenerated spectral curve of the regenerated plurality of spectral curves overlaps with a portion of a second regenerated spectral curve of the regenerated plurality of spectral curves; and reconstructing display characteristics of the plurality of pixels of the display panel using the regenerated plurality of spectral curves.

12. The method of claim 11, wherein the plurality of subpixels of the plurality of colors are turned on simultaneously for capturing by the plurality of imaging devices.

13. The method of claim 11, wherein regenerating the plurality of spectral curves comprises:

generating calibration values by determining a difference between the spectrum of light determined by the color measurement instrument from the one or more of the plurality of pixels and a spectrum of light as represented by signal values of the plurality of captured filtered signals associated with the one or more of the plurality of pixels; and modifying the plurality of captured filter signals using the calibration values.

14. The method of claim 13, wherein reconstructing display characteristics of the plurality of pixels of the display panel comprises:

calculating color correction matrices for the plurality of pixels using the regenerated plurality of spectral curves.

15. The method of claim 11, wherein the plurality of band-pass filters comprise a first band-pass filter configured to block light of wavelengths other than red light for generating a first captured filtered signal of the plurality of captured filtered signals, a second band-pass filter configured to block light of wavelengths other than green light for generating a second filtered signal of the plurality of captured filtered signals, and a third band-pass filter configured to block light of wavelengths other than blue light for generating a third filtered signal of the plurality of captured filtered signals.

16. The method of claim 11, wherein the determined spectrum of light at the predetermined location is captured by a color measurement instrument which is one of a colorimeter, spectrophotometer, or spectroradiometer.

17. The method of claim 11, wherein each filtered image captured by an imaging device is directed to the imaging device by at least one optical element configured to eliminate distortions due to an offset of the imaging device from a center axis of the display panel.

18. The method of claim 11, wherein each filtered image captured by an imaging device is directed to the imaging device by a beam splitter located between the display panel and the imaging device.

* * * * *